United States Patent [19]
Ishikawa et al.

[11] Patent Number: 5,440,587
[45] Date of Patent: Aug. 8, 1995

[54] DEMODULATOR FOR DIGITALLY MODULATED WAVE

[75] Inventors: Tatsuya Ishikawa; Noboru Taga, both of Yokohama, Japan

[73] Assignee: Kabushiki Kaisha Toshiba, Kawasaki, Japan

[21] Appl. No.: 272,862

[22] Filed: Jul. 8, 1994

Related U.S. Application Data

[63] Continuation of Ser. No. 921,018, Jul. 28, 1992, abandoned.

[30] Foreign Application Priority Data

Aug. 7, 1991 [JP] Japan .................................. 3-197789
Aug. 7, 1991 [JP] Japan .................................. 3-197790

[51] Int. Cl.$^6$ ..................... H03D 3/22; H04L 27/14
[52] U.S. Cl. .................... 375/332; 375/329; 375/340; 375/344; 455/260; 455/192.2; 329/304
[58] Field of Search ............... 375/83, 85–86, 375/78, 80–81, 97, 94, 120, 39, 52–54; 455/255, 257–260, 208, 192.1, 192.2; 329/304

[56] References Cited

U.S. PATENT DOCUMENTS

| | | | |
|---|---|---|---|
| 4,926,499 | 5/1990 | Kobayashi et al. | 375/97 |
| 4,943,982 | 7/1990 | O'Neil, II et al. | 375/81 |
| 4,947,409 | 8/1990 | Raith et al. | 375/97 |
| 4,959,656 | 9/1990 | Kumar | 375/94 |
| 5,001,727 | 3/1991 | McDavid . | |

FOREIGN PATENT DOCUMENTS 0373405 6/1990 European Pat. Off. .
8504999 11/1985 WIPO .

OTHER PUBLICATIONS

Alberty et al. "A New Pattern Jitter Free Frequency Error Detector", IEEE Transactions on Communications, vol. 37, No. 2, Feb. 1989, pp. 159–163.

Messerschmitt, "Frequency Detectors for PLL Acquisition in Timing and Carrier Recovery", IEEE Transactions on Communications, vol. COM-27, No. 9, Sep. 1979, pp. 1288–1295.

Fines et al. "A Comparison Study of Low Bit Rate DE-QPSK and TCM 8-PSK Fully Digital Demodulators Over a Land Mobile Satellite Link", IEEE Global Telecommunications Conference & Exhibition Globecom '90, vol. 1, pp. 387–392.

H. Samueli et al. "A VLSI Architecture for a High-Speed All-Digital Quadrature Modulator and Demodulator for Digital Radio Applications", IEEE Journal on Selected Areas in Communications, vol. 8, No. 8, Oct. 1990.

T. Yagi et al. "Development of Digital Demodulator LSI for Staellite Communication", IEICE Conference Fall 1990.

Primary Examiner—Stephen Chin
Assistant Examiner—Hai H. Phan
Attorney, Agent, or Firm—Cushman Darby & Cushman

[57] ABSTRACT

A QPSK modulated wave is inputted to an in-phase detector and an orthogonal detector. The detected components are converted to substantially a base band, and each component is digital-converted by A/D converters. Each digital component is spectrum-shaped by digital LPFs. The outputs of digital LPFs are inputted to a complex multiplier and calculated by use of first and second reproduction carriers and expressed as first and second calculation outputs, and inputted to a phase detector. The phase detector obtains phase difference data between the phase expressed by the first and second calculation outputs and a predetermined phase and quadrant data of the phase. The phase difference data is used for a PLL. The phase difference data is is inputted to a frequency error detection circuit detecting a frequency error. The frequency error output is smoothed by a filter of an AFC loop, and used as a control signal controlling the oscillation frequency of the local oscillation unit. If the frequency error is large, the frequency error detection circuit controls the AFC loop to be in an operation state and the PLL loop and the PLL loop to be in a fixed state. If the frequency error is small, the frequency error detection circuit contains the control state of the AFC loop and switches the PLL loop to be the operation state.

5 Claims, 5 Drawing Sheets

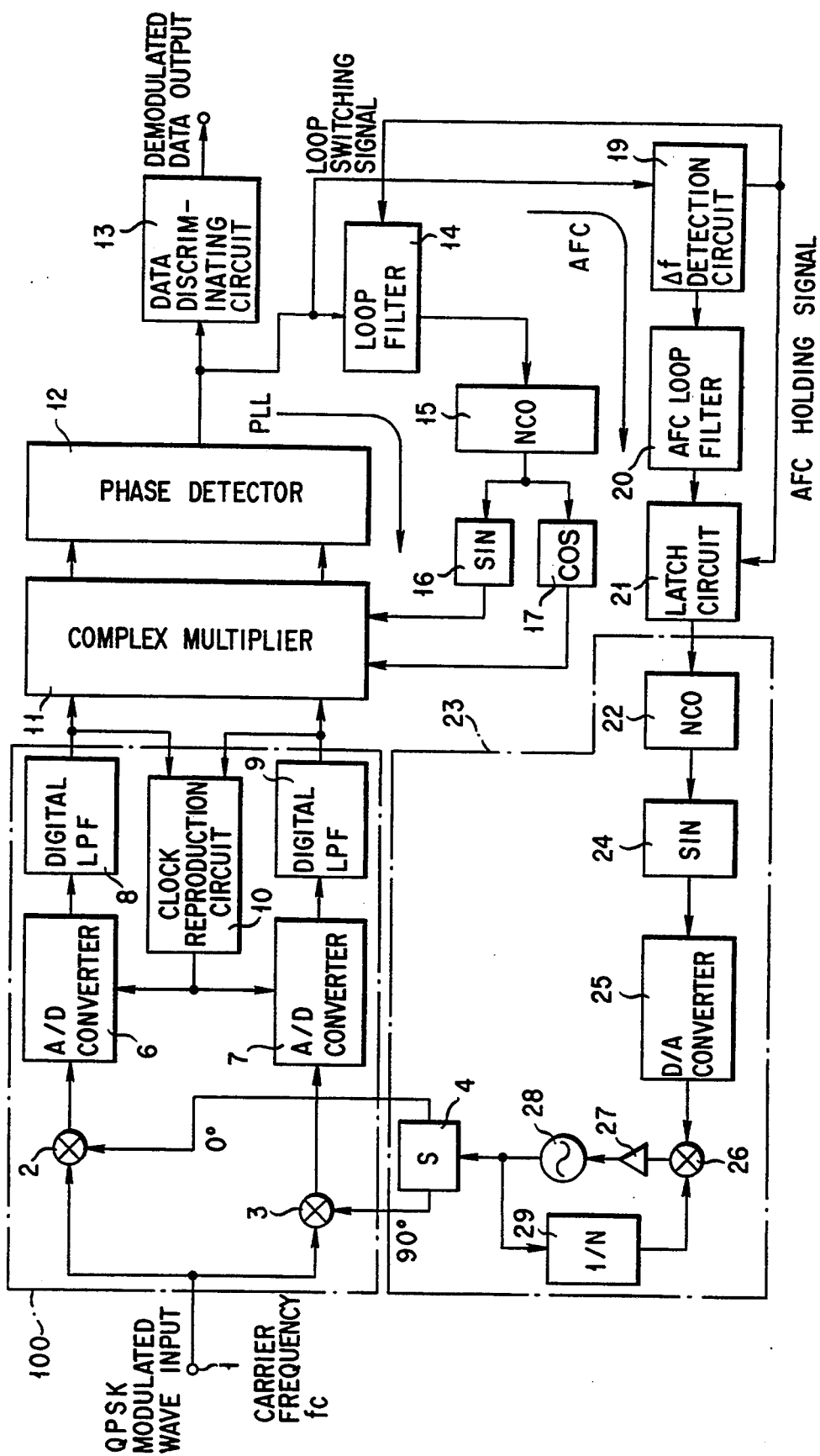
F I G. 1

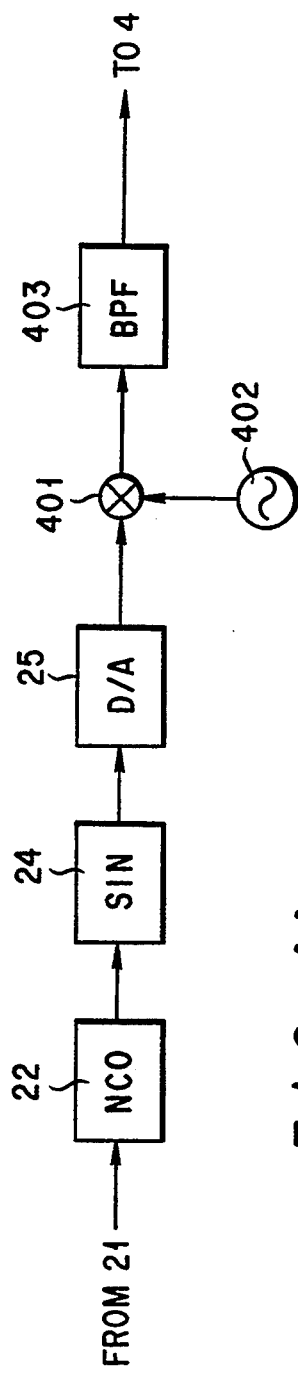
F I G. 4A
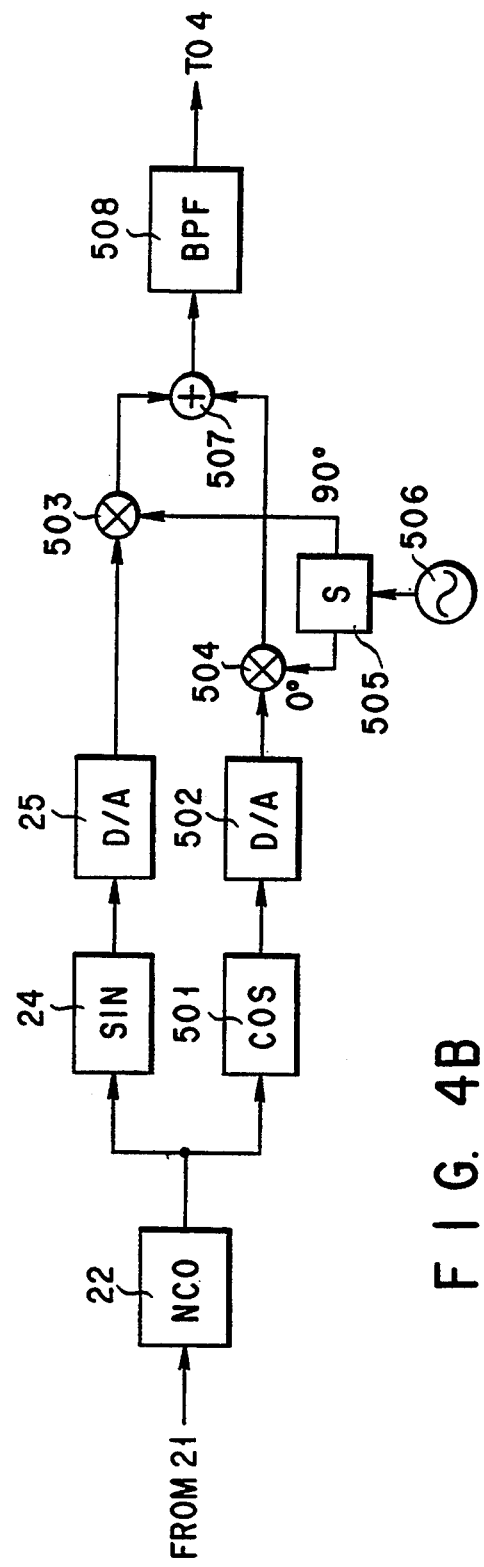
F I G. 4B

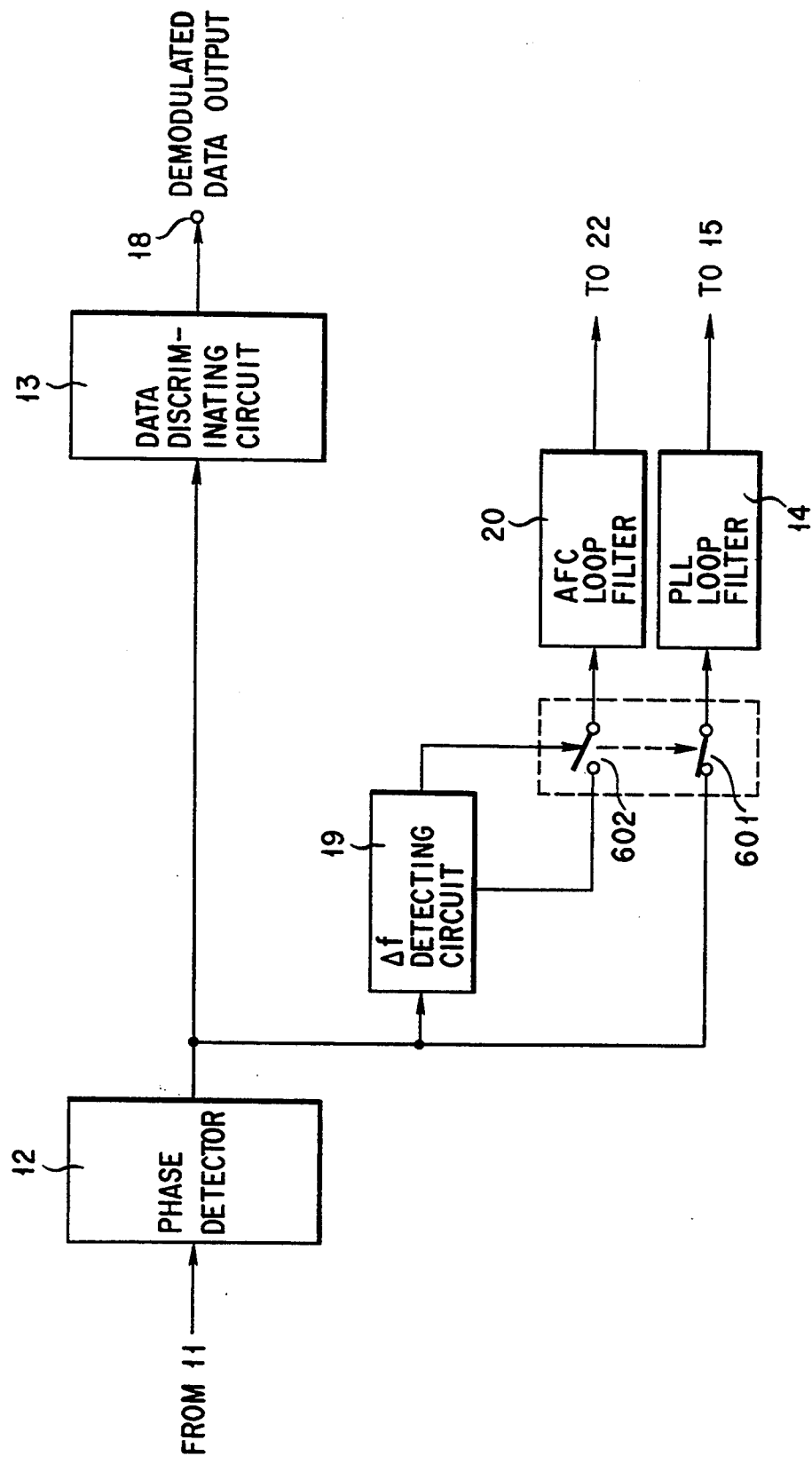
F I G. 5

DEMODULATOR FOR DIGITALLY MODULATED WAVE

This is a continuation of application No. 07/921,018, filed on Jul. 28, 1992, now abandoned.

BACKGROUND OF THE INVENTION

1. Field of the Invention

The present invention relates to a demodulator for digitally modulated waves, which are applied to a satellite communication and a satellite broadcasting.

2. Description of the Related Art

In a system for transmitting an image signal or an aural signal, there is a digital modulation technique for improving the quality of transmission and using the efficiency of frequency, which is conventionally used in the field of a microwave ground communication and a satellite communication for commercial use. As a digital modulation system, there are generally used 16 QAM (and 64 QAM) having good frequency using efficiency for a ground microwave line, and BPSK (and QPSK) having a low transmission code error rate for a satellite line.

In recent years, the digital transmission technique has been used for public use. It is considered that the digital transmission technique will be increasingly spread since the digital transmission technique is excellent in obtaining high quality of transmission and improving frequency using efficiency. However, as a system for public use, what is most important is that a receiver is realized with low cost. Then, the following conditions are required.

(1) The structure is simple, and a scale of a hardware is small;
(2) The number of adjusting portions at the initial stage is less;
(3) Aged deterioration and temperature drift are small and a stable operation can be obtained;
(4) The system is suitable for forming an IC; and
(5) A required performances can be satisfied.

As a conventional demodulation system for a ground microwave line, for example, "Design and Characteristic of High Speed QPSK Carrier Synchronizing System", Yamamoto, et al., NTT Study and Utility, Report, No. 24, Vol. 10, 1975, pp. 253-272 shows the use of a demodulator of an inverse modulation type. However, the structure of this type of demodulator is complicated, and the number of adjusting portions at the initial stage is large, and the manufacturing cost increases. Moreover, there is a problem in stability since an analog circuit is mainly used. This type of demodulator is not proper for forming an IC. Therefore, there are many problems in using this type of demodulator for public use.

As one demodulating system so as to solve the above problems, there has been well-known a demodulator to which a digital signal processing technique is applied. For example, this type of demodulator can be seen in "Development of Digital Demodulation LSI for Satellite Communication" Yagi et al., in Autumn National Meeting in 1990 of the Institute of Electronics, Information and Communication Engineers. In demodulating BPSK or QPSK modulated wave, this demodulator employs a digitized phase lock loop (PLL) for regenerating a carrier to demodulate signals (synchronous detection). This satisfies the requirement of manufacturing a receiver at low cost by non-adjustment and LSI.

The following operation of the receiver disclosed in the above document can be obtained.

The supplied QPSK modulated wave is distributed to two circuits, and detected by an in-phase detector and an quadrature detector. Local generating signals, which are supplied to the in-phase detector and the quadrature detector, respectively, denote local oscillating signals of the local oscillator outputting a fixed frequency, which are distributed to a local oscillating signal having a phase of 0 degree and a local oscillating signal having a phase of 90 degrees by a distributor. The outputs of the in-phase detector and the quadrature detector are respectively inputted to A/D converters, and converted to digital values. Moreover, the digitized outputs are inputted to digital low pass filters (digital LPFs) having the same frequency transfer characteristic, respectively, and are spectrum-shaped. These digital LPFs form a transmission characteristic, which is required to prevent intersymbol interference in a digital data transmission. Moreover, these digital LPFs are designed so as to obtain the so-called roll-off characteristic when a filter characteristic on a transmission side is combined with the above digital LPFs. Due to this, in the output section of the digital LPFs, each detected output is spectrum-shaped such that an Eye-opening rate becomes sufficiently large. The respective outputs of the digital LPFs are supplied to a clock regenerating circuit. In the clock regenerating circuit, competent symbol timing in the signal is extracted, and used as a control input of a clock generator. The output of the clock generator is feedback to the A/D converters. Each of the outputs of the digital LPFs is inputted to a complex multiplier.

In the base band, the complex multiplier can perform the same operation as a frequency converter in an intermediate frequency band, that is, a mixer. The reason the complex multiplier is used as follows.

A multiplier processing not a complex signal but a real signal can only perform the detecting operation but cannot express a negative frequency component in the base band. Due to this, such a multiplier cannot be used as a general frequency converter.

The output of the complex multiplier is inputted to the phase detector, thereby detecting a phase difference between the phase of the input signal and a predetermined phase. The output of the phase detector (phase difference data) is inputted to a data discriminating circuit. The data discriminating circuit discriminates QPSK data based on phase difference data, and demodulates data, and outputs the demodulated data.

The phase difference data is inputted from the phase detector to a frequency control terminal of the numerically controlled oscillator (NCO) via a loop filter so as to regenerate the carrier. The NCO is an accumulation and addition circuit, which does not prohibit overflow, and the adding operation is performed in accordance to a value of the signal to be inputted to the frequency control terminal. Due to this, the accumulation and addition circuit is in an oscillating state, and the oscillation frequency varies based on the value of the control signal. In other words, the accumulation and addition circuit operates in the same manner as the operation of a voltage control oscillator (VCO) in an analog circuit. The different point between the above NCO and the conventional VCO is that the oscillation frequency of the NCO is extremely stable. More specifically, the above NCO is characterized in that the above NCO has higher stability than that of the so-called VCXO using crystal and a wide frequency variable range, which the vCXO cannot realize. The output of the NCO is distributed into two and passed through the data converters having sine and cosine characteristics, and supplied to the complex multiplier as a multiplier factor. The loop of one circulation having the phase detector, loop filter, NCO, data converters, and complex multiplier is a phase lock loop (PLL) having the complete digital structure. If a circuit having a complete integral system is included in the loop filter, a frequency pull-in range of PLL is, in principle, infinite, and an ideal operation as a PLL can be expected. The operations after the A/D converters are all performed in a digital signal processing. If an IC formation is made, the demodulator can be realized without adjusting, so that the extremely compact apparatus can be provided.

However, even in the demodulator using the above digital PLL, there remains a problem of the frequency detuning of the frequency converting section comprising the phase detector and the quadrature detector. In the satellite communication and the satellite broadcasting, it is difficult to enhance stability of the frequency converter, which is used to make an up-link frequency and a down-link frequency different, in a relay mounted on the satellite, and generally a large frequency detuning is provided. Moreover, in consideration of the receiver for public use, the manufacturing cost of the down converter of frequency synthesizer type whose frequency is considerably stable is high, and this makes it difficult to spread such type of converter. For this reason, in general, the frequency converting is performed by a circuit whose manufacturing cost is low such as a circuit using a dielectric resonator for local generation. Therefore, if such a frequency converter is used, occurrence of the frequency detuning cannot be avoided.

For example, when a broadcasting wave of 12 GHz band is received and frequency-converted, the converted frequency is shifted from a desired frequency over 1 MHz or more, and inputted into the demodulator. Regarding the demodulator having the above-mentioned digital PLL, the above explained that the frequency pull-in range of PLL was infinite. However, the following problem exists.

That is, it is assumed that detuning occurs in the input frequency and the central frequency (carrier frequency) of the modulated wave spectrum becomes fc, which is a frequency shifted from frequency fL. If the frequency of the local oscillation signal of the fixed frequency is fL, the spectrum of each of the detected outputs is a spectrum whose positive and negative sides are not symmetrical to the frequency 0 (direct current). After the spectrum is digitized, the digitized spectrum is spectrum-shaped by the digital LPF. However, the characteristic of the digital LPF is a band frequency whose positive and negative sides are symmetrical to the frequency 0 (direct current). Due to this, if the detected output is a spectrum, which is a symmetrical to the frequency 0, the spectrum of the detected output is partially cut by the previous detuning component. This means that the transmission characteristic for preventing the intersymbol interference is not satisfied. As a result, the Eye-opening rate becomes small, and the code error rate is deteriorated.

SUMMARY OF THE INVENTION

An object of the present invention is to provide a demodulator for digitally modulated waves in which a receiving performance is not deteriorated even if a frequency detuning of a transmission signal sent from a satellite or a frequency detuning of a receiver exists in a detected output signal of a frequency converter.

In order to attain the above object, the demodulator of the present invention comprises a local oscillation unit for oscillating first and second frequency converting carriers whose phase axes are different; a frequency converting unit for converting components of first and second phase axes of a digital modulated wave to a frequency band, which is substantially a base band, by said first and second frequency converting carriers, wherein said components of first and second phase axes are digitally converted, each digital-converted component is spectrum-shaped by first and second digital low pass filters, thereby obtaining first and second digital signals; complex multiplier means for multiplying said first and second digital signals by first and second reproducing carriers and for obtaining first and second calculation outputs having an expression of a complex number by a calculation of a complex number; means for obtaining phase difference data corresponding to a phase expressed by said first and second calculation outputs obtained by said complex multiplying means and quadrant data by a phase detection, and for obtaining demodulation outputs having a multi-phase from said phase difference data and quadrant data; phase lock loop (PLL) means for outputting said first and second reproducing carriers by that a smoothing output by smoothing said phase difference data by a first loop filter, an oscillation frequency of a numerically controlled oscillator (NCO) is controlled by said smoothing output, and an oscillation output of said NCO is data-converted by a data converter; and AFC loop means for controlling an oscillation frequency of said local oscillation unit by a smoothing output, wherein said phase difference data is inputted, a frequency error between the carrier frequency of said digital modulated wave and the oscillation frequency of said local oscillation unit is detected, thereby obtaining a frequency error output, and said smoothing output is obtained by smoothing the output of said frequency error.

According to the present invention, at the time of starting the system or changing the channel, the frequency error is detected, and the local frequency control due to the frequency error, that is, AFT operation is performed. Thereby, the frequency of the input modulation wave and the detuning state of the local frequency of the system itself are detected, and the detected result, that is, frequency error is made small by the AFC loop.

After the operation of AFC loop, the carrier reproducing is performed by the phase lock loop (PLL).

In the PLL, there is no digital low pass filter for spectrum-shaping. As a result, there is no occurrence of a phenomenon in which the modulation wave spectrum is partially cut on the output side of the digital LPFs for spectrum-shaping the A/D-converted phase and quadrature (orthogonal) detected outputs. Thereby, the spectrum-shaping can be correctly performed. Due to this, even if there is a frequency detuning in the frequency of the input demodulation wave, an Eye-opening rate is not deteriorated. Moreover, since there is no large delay element (digital filter) in the PLL loop, there is no deterioration of a jitter characteristic at the time of the PLL operation.

After the frequency detuning component is made sufficiently small by AFC, there is provided means for holding AFC and for making good use of PLL, thereby PLL is operated. Then, the frequency error is slightly pulled in, thereafter, a phase clock is accomplished.

BRIEF DESCRIPTION OF THE DRAWINGS

FIG. 1 is a structural view showing one embodiment of the present invention;

FIGS. 4A and 4B are views showing other embodiment of loop changing means of FIG. 1; and FIG. 5 is a view showing further other embodiment of loop changing means of FIG. 1.

DETAILED DESCRIPTION OF THE PREFERRED EMBODIMENTS

Figure 2:
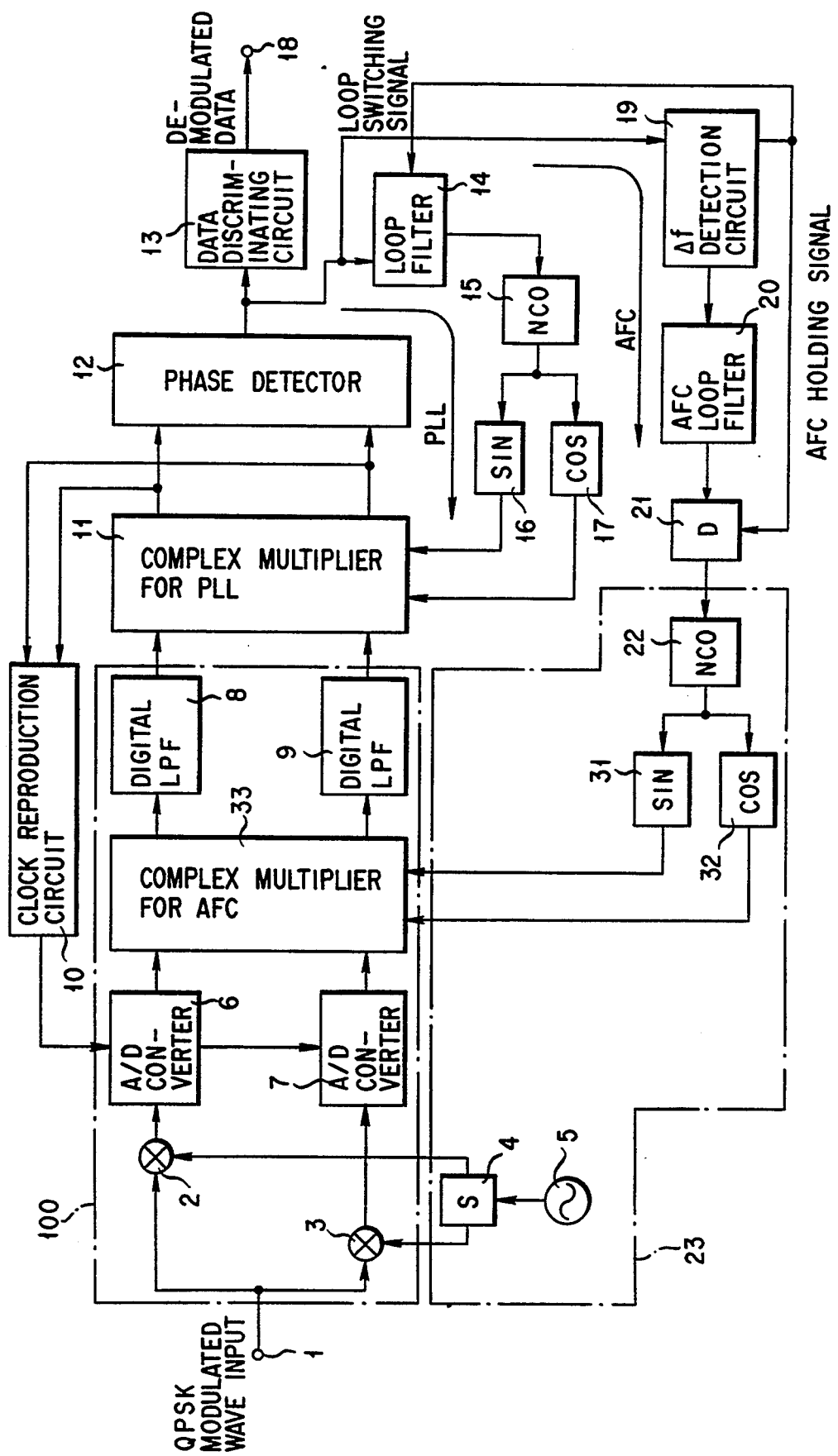
FIG. 2 is a structural view showing other embodiment of the present invention.

Embodiments of the present invention will be explained with reference to drawings.

FIG. 1 shows one embodiment of the present invention. A QPSK modulated wave sent to an input terminal 1 is distributed into an in-phase detector 2 and an orthogonal detector 3. Further, a local oscillating signal having a phase of 0 degree and a local oscillating signal having a phase of 90 degrees serving as carriers for frequency conversion are supplied to the detectors 2 and 3. The local oscillating signals are sent from a distributor 4 of a local oscillation unit 23 having a function of converting a frequency. The outputs of the detectors 2 and 3 are inputted to A/D converters 6 and 7, and converted to digital values. Moreover, the digitized detected outputs are inputted to digital low pass filters (digital LPFs) 8 and 9 having the same frequency transfer characteristic, and spectrum-shaped. The digital LPFs 8 and 9 form a transmission characteristic, which is required to prevent intersymbol interference in a digital data transmission.

The digital LPFs 8 and 9 are designed so as to obtain the so-called roll-off characteristic when a filter characteristic on a transmission side is combined with these digital LPFs. Due to this, each detected output of the output sides of the digital FPFs 8 and 9 is spectrum-shaped such that an Eye-opening rate becomes sufficiently large. The respective outputs of the digital LPFs 8 and 9 are supplied to a clock reproduction circuit 10. In the clock reproduction circuit 10, a component (clock phase component) of a symbol timing in the signal is extracted, and supplied to a control terminal of a clock generator. A clock generated by the clock generator is supplied to A/D converters 6 and 7. The reason both the in-phase detection output and the orthogonal detection output are inputted to the clock reproduction circuit 10 is to improve a detecting rate and to obtain a phase clock state rapidly in a case where the clock of the clock generator and an phase error of the detection output are detected in the phase lock loop of the clock reproduction circuit 10. Basically, either the in-phase detection output or the orthogonal detection output may be inputted to the clock reproduction circuit 10. The outputs of the LPFs 8 and 9 are respectively inputted to a complex multiplier 11.

The circuit arrangement, which comprises the in-phase detector 2, orthogonal detector 3, A/D converters 6 and 7, digital LPFs 8, separates the inputted digital modulated wave into components of an orthogonal phase axis, and serves as a frequency converting unit 100 for converting each component to substantially a base band frequency.

The complex multiplier 11 can realize the same operation as that of a frequency converter in the intermediate frequency band, that is, a mixer by the base band frequency. The reason the complex multiplier 11 is used is as follows.

A multiplier of a real number type using no complex number can perform the detecting operation but cannot express the component of the negative frequency. Due to this, such a multiplier is not used as a general frequency converter. The complex multiplier 11 multiplies signals sent from the digital LPFs 8 and 9 by reproducing carriers obtained from data converters 16 and 17 to be explained later, thereby obtaining a calculation output having an expression of a complex number (real number and imaginary number) by the result of the multiplication.

The calculation output of the complex multiplier 11 is inputted to a phase detector 12. The phase detector 12 detects phase difference data (AS) between a phase $\theta$ of the input signal and a predetermined phase. That is, the calculation output is expressed by the real number section and the imaginary number section. It is assumed that the value of the real number section of the signal expressed by the complex number is $\sin\theta = A$, and the value of the imaginary section is $\cos\theta = B$, $(A/B) = (\sin\theta/\cos\theta) = \tan\theta$. Therefore, if the calculation of $\theta = \tan^{-1}(\sin\theta/\cos\theta)$ is performed, the phase $\theta$ can be obtained.

In the case of QPSK modulated wave, a symbol phase is 45° C., 135° C., 225° C., or 315° C. The phase detector 12 detects phase difference data (AS) between the phase $\theta$ and the symbol phase, that is, first quadrant (45° C.), second quadrant (135° C.), third quadrant (225° C.), or fourth quadrant (315° C.). If the calculation output of the complex multiplier 11 is data in the first quadrant (0° C. to 90° C.), phase difference data between the phase $\theta$ and the symbol phase of 45° C. is detected. If the calculation output of the complex multiplier 11 is data in the second quadrant (90° C. to 180° C.), phase difference data between the phase 8 and the symbol phase of 135° C. is detected. If the calculation output of the complex multiplier 11 is data in the third quadrant (180° C. to 270° C.), phase difference data between the phase $\theta$ and the symbol phase of 225° C. is detected. If the calculation output of the complex multiplier 11 is data in the fourth quadrant (270° C. to 360° C.), phase difference data between the phase $\theta$ and the symbol phase of 315° C. is detected. The phase difference data expresses the phase difference between the input signal and the reproducing carrier.

The phase detector 12 comprises a read-only memory (ROM) the calculation output of the complex expression which is used as an address input. Then, the phase difference data ($\Delta\theta$) can be outputted in accordance with the phase $\theta$. This may be realized by a first calculation circuit, which can approximate to an arc tangent characteristic, and a second calculation circuit, which can obtain phase difference data ($\Delta\theta$) from the approximated phase $\theta$.

The outputs (phase difference data and quadrant data) of the phase detector 12 are inputted to a data discriminating circuit 13. The data discriminating circuit 13 discriminates phase difference data sent from the phase detector 12 and QPSK data sent from quadrant data, and demodulates data, and outputs the demodulated data. The phase detector 12 includes a quadrant data discriminating unit, which discriminates as to which quadrant divided by orthogonal axes (I axis and Q axis) a complex calculation output exists by use of most significant bits of the outputs of the real number and the imaginary number sent from the complex multiplier 11.

Moreover, phase difference data sent from the phase detector 12 is inputted to a frequency control terminal of a numeral value control oscillator (NCO) 15 via a loop filter 14 so as to reproduce the carrier. The NCO 15 is an accumulation and addition circuit, which does not prohibit overflow, and the adding operation can be performed up to the dynamic range in accordance to a value of a signal to be inputted to the frequency control terminal. Due to this, the accumulation and addition circuit is in an oscillating state, and the oscillation frequency varies based on the value of the control signal. In other words, the accumulation and addition circuit operates in the same manner as the operation of a voltage control oscillator (VCO) in an analog circuit. The different point between the above voltage control oscillator and the general VCO is that the oscillation frequency is extremely stable. More specifically, the above voltage control oscillator is characterized in that the above voltage control oscillator has higher stability than that of the so-called VCXO using crystal and a wide frequency variable range, which the VCXO cannot realize. The output of the numeral value control oscillator 15 is distributed into two and inputted to data converters 16 and 17 having sine and cosine characteristics. The outputs of the data converters 16 and 17 are used as a multiplier factor of the complex multiplier 11. The loop of one circulation having the phase detector 12, loop filter 14, numeral value control oscillator 15, data converters 16, 17, and complex multiplier 11 is a phase lock loop (PLL) having the complete digital structure. If a circuit having a complete integral system is included in the loop filter 14, a frequency pull-in range of PLL is, in principle, infinite, and an ideal operation as a PLL can be expected. The operations after the A/D converters 6, 7 are all performed in a digital signal processing. If the IC formation is made, the demodulator can be realized without adjusting, so that the extremely compact apparatus can be provided.

In the above system, an AFC loop is formed. More specifically, a phase error signal outputted from the phase detector 12 is supplied to a frequency error detection circuit 19. The frequency error detection circuit 19 detects a frequency difference between an input signal and a local oscillating signal. The frequency error component is smoothed by an AFC loop filter 20 and passed through a latch circuit 21, and supplied to a frequency control terminal of a numerical value control oscillator (NCO) 22 forming a local signal generating unit 23. An oscillation output of NCO 22 is a serrate signal, and is supplied to a data converter 24 having a sine converting characteristic or a cosine converting characteristic. An output of the data converter 24 is supplied to the D/A converter 25, and is converted to an analog signal. An output of a D/A converter 25 is supplied to a phase detector 26 forming a frequency gradually amplifying circuit. An output of the frequency gradually amplifying circuit is inputted to the distributor 4 as a local oscillating signal, and is distributed to a local oscillating signal having a phase of 90 degrees and a local oscillating signal having a phase of 0 degree. The structure and operation of the frequency gradually amplifying circuit will be explained later.

If the frequency detuning of the output of a quasi-synchronous and orthogonal detecting section is sufficiently made small by the AFC operation, the frequency error detection output of the frequency error detection circuit 19 varies. Thereby, a loop switching signal and an AFC holding signal are outputted from the frequency error detection circuit 19. The AFC holding signal is substantially the same signal as the loop switching signal. The loop switching signal switches the loop filter 14 to the operating state. Thereby, a PLL operation is started and frequency error data in the AFC loop is held in the best AFC state. By the PLL operation, a pull-in operation is started so as to obtain carrier synchronization.

The structure and operation of the frequency gradually amplifying circuit will be explained.

The frequency gradually amplifying circuit comprises a phase detector 26, an amplifier 27 amplifying the detected output, a voltage control oscillator 28 supplying the output of the amplifier 27 to the frequency control terminal, and a divider 29 N-dividing the output of the voltage control oscillator 28. The output of the divider 29 is supplied to the phase detector 26. The frequency gradually amplifying circuit forms PLL. For example, if the output of the voltage control oscillator 28 is 4.375 MHz and a dividing ratio of the divider 29 is 32, the oscillation frequency of the voltage control generator 28 is 140 MHz. In order that the oscillation frequency of the numeral value control oscillator 22 is set to 4.275 MHz in a state that there is no frequency error, an offset component, which corresponds to the oscillation frequency, may be added to the frequency control input of the numeral value control oscillator 22 in advance.

As a result, the portion, which is from NCO 22 to the voltage control oscillator 28 can be regarded as one numeral value control oscillator of 140 MHz. Due to this, the oscillation frequency is extremely stable, and the stability, which is tens of times the normal voltage control oscillator, can be obtained. The amplifier 27 contained in the frequency gradually multiplying circuit is normally a loop filter. In this case, the design of the whole AFC loop can be made easy since the response to the frequency gradually multiplying circuit is preferably high speed. Due to this, in this embodiment, the circuit is shown by simply the amplifier and not the loop filter. If the response to the frequency gradually multiplying circuit is low speed, the time constant is determined by the overall characteristic of the time constant of the AFC loop filter. The output of the voltage control oscillator 28 is input to the distributor 4, and distributed to a local oscillating signal having a phase of 0 degree and a local oscillating signal having a phase of 90 degrees. The distributed outputs are used as local oscillation signals of the in-phase detector 2 and the orthogonal detector 3 in the quasi-synchronous and orthogonal detecting section, respectively.

According to the above system, unlike the conventional demodulator using the local oscillation signals of the fixed frequency in the quasi-synchronous and orthogonal detecting section, the local oscillation signals are feedback-controlled by the frequency error output. Due to this, the local oscillation signals are orthogonal-detected in substantially no frequency detuning state. Therefore, the spectrum is not cut at the time when the outputs are spectrum-shaped by the digital LPFs. Thereby, demodulation can be obtained in substantially an ideal state.

In the carrier reproduction PLL, there is not contained a large delay element such as a digital filter. Due to this, no jitter occurs. That is, the operation of the carrier reproduction having a good jitter characteristic can be performed. Moreover, since the frequency pull-in range of PLL can be widely obtained, there is no need of extremely precise characteristic in AFC operation. In other words, even if the frequency error in the pull-in range of the PLL circuit remains, the operation of the carrier reproduction can be performed.

The present invention is not limited to the above embodiment.

FIG. 2 shows the other embodiment of the present invention.

The same reference numerals as those of the circuit of FIG. 1 are added to the same portions as the circuit of FIG. 1, and the explanation of these portions is omitted. The portions, which are different from the previous embodiment, are explained.

In this embodiment, the local oscillation unit 23 comprises a first local oscillation circuit and a second local oscillation circuit. The first local oscillation circuit comprises the local oscillator 5, which is used to obtain the local oscillation signal of the fixed frequency, and the distributor 4, which distributes the local oscillating signal to a local oscillating signal having a phase of 0 degree and a local oscillating signal having a phase of 90 degrees. The second local oscillation circuit comprises NCO 22, and data converters 31 and 32. Moreover, in the frequency converting unit 100, there is a complex multiplier 33 is provided to supply the carrier from the second local oscillation circuit to the portion between the A/D converters 6, 7 and the digital LPFs 8, 9.

The output of the local oscillator 5 (first local oscillation circuit) is distributed to the local oscillating signal having a phase of 0 degree and the local oscillating signal having a phase of 90 degrees by the distributor 4, and supplied to the in-phase detector 2 and the orthogonal detector 3 in the quasi-synchronous and orthogonal detecting section. The outputs of the A/D converters 6 and 7 are inputted to the complex multiplier 33 for AFC. The output of the complex multiplier 33 is inputted to the digital LPFs 8 and 9. The output of the data converter 31 having a sine characteristic as a multiplier factor and the output of the data converter 31 having a cosine characteristic and supplied to the complex multiplier as a multiplier factor are supplied to the complex multiplier 33. The output of NCO 22 is supplied as inputs of the converters 31 and 32.

The circuit arrangement, which comprises the in-phase detector 2, orthogonal detector 3, A/D converters 6 and 7, digital LPFs 8, separates the inputted digital modulated wave into components of an orthogonal phase axis, and serves as a frequency converting unit 100 for converting each component to substantially a base band frequency.

The complex multiplier 33 frequency-converts the digitized output precisely to be further close to the base band. The local oscillation signal (the output of the second local oscillation circuit), serving as a frequency converting carrier, is supplied from the AFC loop to the complex multiplier 33. The output obtained from the complex multiplier 33 is inputted to the digital LPFs 8 and 9 having the same frequency transfer characteristic and spectrum-shaped.

The AFC loop of this system is formed as follows.

That is, the phase error signal outputted from the phase error detector 12 is supplied to the frequency error detection circuit 19. The frequency error detection circuit 19 detects the frequency error between the input signal and the local oscillation signals (first and second local oscillation signals). The frequency error component is smoothed by the AFC loop filter 20 and passed through the latch circuit 21, and supplied to the frequency control terminal of NCO 22. The oscillation output of NCO 22 is a serrate signal, and is inputted to the data converter 31 having a sine converting characteristic and the data converter 32 having a cosine converting characteristic. The outputs of the data converters 31 and 32 are supplied to the complex multiplier 33 as second local oscillation signals. Thereby, an AFC loop is formed.

If the predetermined frequency detuning between the input signal and the local oscillation signal is sufficiently made small by the AFC operation, the frequency error detection output of the frequency error detection circuit 19 varies. Thereby, the loop switching signal and the AFC holding signal are outputted from the frequency error detection circuit 19. The AFC holding signal is substantially the same signal as the loop switching signal. The loop switching signal switches the loop filter 14 to the operating state. Thereby, a PLL operation is started and frequency error data in the AFC loop is held in the best AFC state. By the PLL operation, the pull-in operation is started so as to obtain carrier synchronization.

The frequency converting operation due to the complex multiplier 33 will be explained as follows.

Generally, the frequency conversion in the intermediate frequency (IF) band is performed by an analog mixer, and realized by obtaining a sum frequency competent of the local oscillation frequency and the input frequency and and a difference frequency component therebetween. In this case, such an operation is based on the condition that each spectrum is, in principle, not less than d.c. (0 frequency). If a part of the output of the frequency conversion becomes a frequency component, which is less than d.c., the component is returned by d.c. As a result, the detection of the returned component is performed. The negative frequency, which is less than d.c., may be expressed by a complex number. Therefore, the mixer operation may be performed in the complex number expressing area. Since the mixer operation is simply a multiplication, and the frequency conversion close to d.c. (that is, close to the base band) can be freely realized by the complex multiplier without considering the returned component of the spectrum.

The above embodiment can realize the frequency conversion for AFC by use of the complex multiplier 33. The same operation can be performed by the complex multiplier in the digital PLL.

Also, in this embodiment, unlike the conventional demodulator using the local oscillation signals of the fixed frequency in the quasi-synchronous and orthogonal detecting section, the local oscillation signals are feedback-controlled by the frequency error output. Due to this, the local oscillation signals are orthogonal-detected in substantially no frequency detuning state. Therefore, the spectrum is not cut at the time when the outputs are spectrum-shaped by the digital LPFs. Thereby, demodulation can be obtained in substantially an ideal state. In other words, in the demodulation of the digital modulated wave, even if the frequency detuning exists in the transmission system, the deterioration of the Eye-opening, which is caused by the shift of the inputted frequency, little occurs in the digital LPF.

Thereby, demodulation having no data transmission error can be obtained. In the receiving device according to the above embodiment, the entire AFC loop is formed of a digital circuit, and there is no control to the analog section. Due to this, non-adjustment and IC formation can be easily made, and a demodulator can be manufactured at a low cost.

Figure 3A:
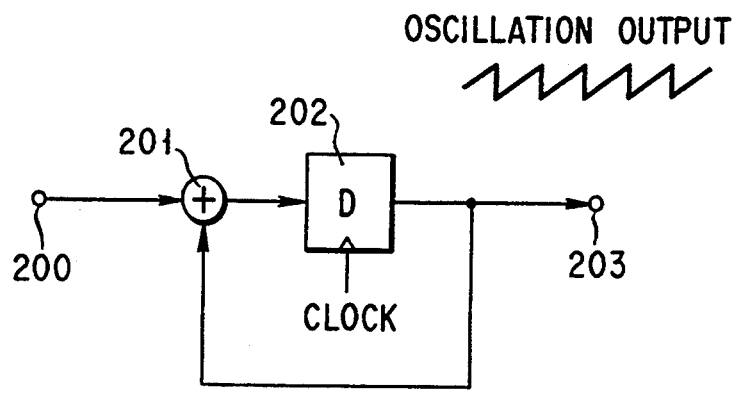
FIG. 3A is a circuit diagram showing a specific structure of a numerical value control oscillator of FIG. 1.

FIG. 3A is a specific example of NCO 22 for an AFC loop. The contents of NCO 22 are the same as those of the NCO 15 in the PLL. The signal inputted to a frequency control terminal 200 is supplied to one input of an adder 201. The output of the adder 201 is delayed by one clock component by a latch circuit 202, and inputted to the other input of the adder 201. As a result, the output of the latch circuit 202 operates as an accumulator as shown in the drawing, and outputs a serrate wave. The oscillation frequency can be controlled by the numeral value to be added to the control terminal 200 if the clock is a fixed frequency.

Figure 3B:
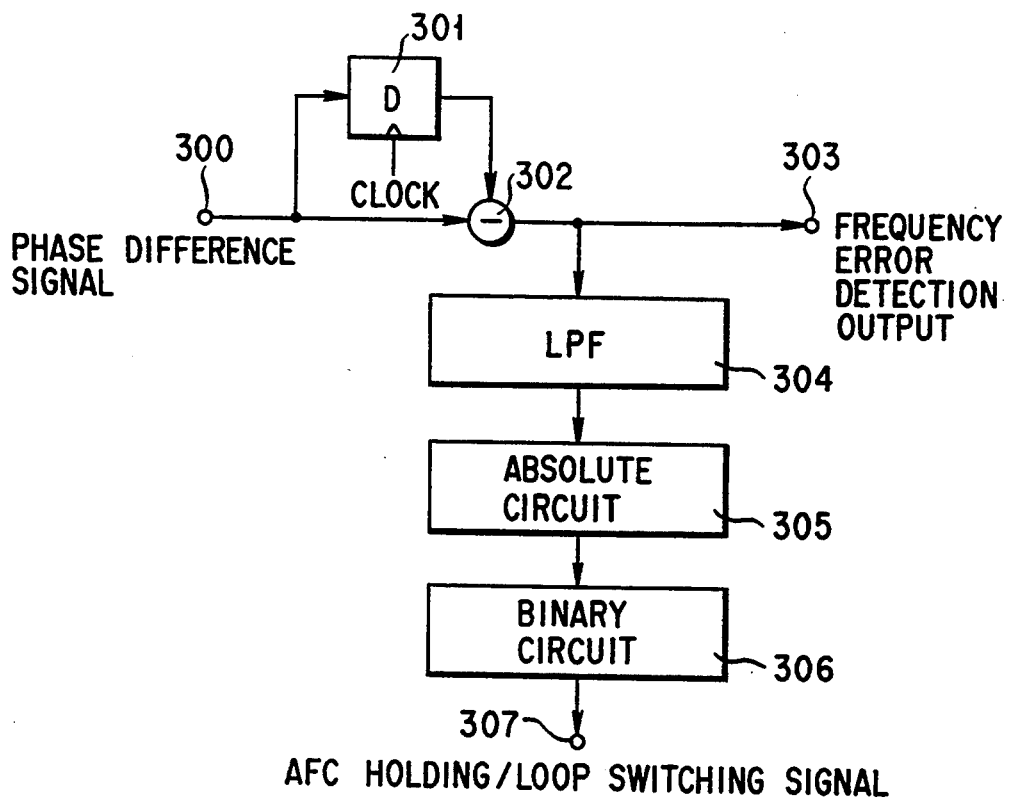
FIG. 3B is a circuit diagram showing a specific structure of a frequency error detection circuit of FIG. 1.

FIG. 3B is an example of the arrangement of the frequency error detection circuit 19. It is assumed that a phase error signal is inputted to an input terminal 300. A circuit, which comprises a latch circuit 301 using a symbol timing of the digital modulated wave as a clock and a subtracter 302, detects a phase change the respective symbols of the digital modulated wave. This is no more than to obtain the frequency error. Due to this, the output is outputted to an output terminal 303 as a frequency error detection output. The frequency error detection output is branched to a low pass filter (LPF) 304, and sufficiently smoothed. Thereafter, the output is passed through an absolute circuit 305, which is used for removing positive and negative codes, and made binary by a binary circuit 306. The binary output is outputted as a signal (AFC holding and loop switching signals) for controlling which operation should be performed, AFC or PLL.

Regarding the local oscillation unit 23, the embodiment of FIG. 1 showed the following structure.

That is, the output of NCO 22 is supplied to the data converter 24 to be converted to the sine wave. The output of the data converter 24 is supplied to the D/A converter 25. Moreover, the analog conversion output is supplied to the frequency gradually multiplying circuit.

However, other frequency conversion circuit can be used as a local oscillation unit.

FIG. 4A shows the other embodiment of the local oscillation unit using a mixer.

The same reference numerals as FIG. 1 are added to the portions, which are common to the circuit of FIG. 1. The output of NCO 22 is converted to the sine wave by the data converter 24 having a sine conversion characteristic, and is further converted to an analog sine wave by the D/A converter 25. The output is supplied to a RF input terminal of a mixer 401. An output of an oscillator 402 having a fixed frequency is supplied to a local oscillation input section of the local mixer 401. If the frequency of the sine wave is 4 MHz, the oscillation frequency of the local oscillator 402 is set to 144 MHz or 136 MHz in order to obtain the conversion output of 140 MHz. Regarding the conversion output, a local oscillation leak component and an image component are removed by the band pass filter (BPF) and supplied to the distributor 4.

As compared with the frequency conversion system using the frequency gradually multiplying circuit, the system using the above local oscillation unit is characterized in that the frequency change of the output of NCO 22 and that of the output of the low pass filter 403 are the same, and there is no increase in the phase jitter, which is caused by the frequency gradually multiplying operation.

FIG. 4B shows the other embodiment of the local oscillation unit using the orthogonal modulator.

The output of NCO 22 is converted to the sine wave by the data converter 24 having the sine conversion characteristic, and further converted to the analog sine wave by the D/A converter 25. The output is supplied to the RF input terminal of a mixer 503. The output of NCO 22 is converted to the cosine wave by a data converter 501 having a cosine conversion characteristic, and further converted to the analog cosine wave by a D/A converter 502. The output is supplied to the RF input terminal of a mixer 504.

Reference numeral 506 is a local oscillator having a fixed frequency. The oscillation output is distributed to an output having a phase of 0 degree and an output having a phase of 90 degrees by a distributor 505. The oscillation output having a phase of 0 degree is supplied to the mixer 504, and the oscillation output having a phase of 90 degrees is supplied to the mixer 503. The outputs of the mixers 503 and 504 are synthesized by a synthesizer 507, and supplied to the distributor 4 via a band pass filter (BPF) 508. In this circuit, since each image image component to be generated in the outputs of the two mixers 503 and 504 are canceled at the time of synthesizing, the characteristic of the band pass filter may be relatively lenient.

Moreover, according to this embodiment, the switching of the AFC operation and the PLL operation can be realized by controlling the latch circuit 21 and the PLL loop filter 14. In the frequency error detection circuit 19, when a control signal in which the frequency error is sufficiently made small is generated, the latch circuit 21 and the PLL loop filter 14 are controlled. The present invention is not limited to this embodiment, and the other embodiment can be made.

FIG. 5 shows the other embodiment of switching means for switching the AFC operation and PLL operation. The phase difference data ($\Delta\theta$) sent from the phase detector 12 is supplied to the frequency error detection circuit 19. The operation of the frequency error detection circuit 19 is explained as the above. If the frequency error is sufficiently made small, the control signal is outputted. The output of the phase detector 12 is supplied through a switch 601 before being supplied to the loop filter 14 on the PLL side. The frequency error detection signal obtained by the frequency error detection circuit 19 is supplied through a switch 602 before being the AFC loop filter 20. The switches 601 and 602 are controlled by the control signal sent from the frequency error detection circuit 19 such that the other switch is turned off when one switch is turned on.

According to the above structure, if the frequency error of the output of the phase detector 12 is large, the switch 602 is switched on, and the AFC operation is performed. If the frequency error is sufficiently made small, the PLL operation is performed. Thereby, the loop switching can be realized.

In the above-explained demodulation of the digital modulation wave, even if the frequency detuning exists in the transmission system, the deterioration of the Eye-opening, which is caused by the shift of the inputted frequency, little occurs in the digital LPF. Thereby, demodulation having no data transmission error can be obtained. Moreover, since no digital PLL is contained in the PLL, there is no generation of the phase jitter due to influence of the delay in the loop. Therefore, demodulation of the digital demodulated wave can be obtained in an extremely good state. The above embodiment was explained as a demodulator for QPSK modulated wave. The present invention can be, of course, applied to a demodulator for a digitally modulated wave having a multi-phase other than the PQSK modulated wave.

As mentioned above, according to the present invention, even if there exists the frequency detuning in the transmission signal sent from the satellite or in the detection output signal of the frequency conversion section of the receiver, no deterioration occurs in the receiving performance.

What is claimed is:

1. A demodulator for demodulating a digitally modulated wave, comprising:

a local oscillation unit for modulating a first frequency converting carrier and a second frequency converting carrier, wherein said first frequency converting carrier and said second frequency converting carrier have carrier phase axes which are different, and wherein said local oscillation unit comprises an oscillation frequency control terminal;

a frequency converting unit for converting components of a first phase axis and a second phase axis of a digital modulated wave to a frequency band in accordance with said first frequency converting carrier and said second frequency converting carrier, respectively, thereby obtaining a first digital signal and a second digital signal, wherein said frequency band is substantially a base band, and wherein said first digital signal and said second digital signal are produced by digitally converting said components of said first phase axis and said components of said second phase axis and by spectrum-shaping each said digitally converted component;

complex multiplier means for multiplying said first digital signal and said second digital signal by a first reproducing carrier and a second reproducing carrier and for obtaining a first calculation output and a second calculation output, wherein said first calculation output and said second calculation output each having an expression which comprises a complex number;

means for obtaining phase difference data and quadrant data corresponding to a phase expressed by said first calculation output and second calculation output, and for obtaining a demodulation output having a multi-phase from said phase difference data and said quadrant data;

phase lock loop means, for producing said first reproducing carrier and said second reproducing carrier, wherein said phase lock loop comprises:

a first loop filter for filtering said phase difference data, thereby producing filtered phase difference data;

a first numerical value control oscillator for receiving said filtered phase difference data, and for generating oscillated phase difference data in accordance with said filtered phase difference; and data conversion means for converting said oscillated phase difference data, thereby producing said first reproducing carrier and said second reproducing carrier; and automatic frequency control means for controlling an oscillation frequency of said local oscillation unit, wherein said automatic frequency control means comprises:

a second loop filter for filtering a frequency error data, thereby outputting filtered frequency error data;

latch means for latching said filtered frequency error data, thereby outputting latched frequency error data and for supply said latched frequency error data to said oscillation frequency control terminal; and frequency error detection means for outputting said frequency error data, wherein said frequency error data is based upon said phase difference data, and wherein said frequency error detection means comprises:

means for continuing an operation state of said automatic frequency control means by setting said output of said latch means to be in a through state and said output of said phase lock loop means to be in a fixing state when a value of said frequency error data is larger then a first predetermined value, and for controlling said phase lock loop means to be in an operating state by maintaining said output of said latch means when said value of said frequency error data is smaller than said first predetermined value.

2. A demodulator according to claim 1, wherein said local oscillation unit further comprises:

a second numerical value control oscillator for oscillating said latched frequency error data, thereby producing an oscillated frequency error;

a data converter for data-converting said oscillated frequency error by one of a sine conversion characteristic and a cosine conversion characteristic, thereby producing a data-converted frequency error;

a D/A converter for analog-converting said data-converted frequency error, thereby producing analog frequency error data;

a frequency multiplying circuit for frequency-multiplying said analog frequency error data by a second predetermined value, thereby producing frequency-multiplied error data; and a distributor for distributing said frequency-multiplied error data, thereby producing said first frequency converting carrier having a phase of 0 degrees and said second frequency converting carrier having a phase of 90 degrees; and wherein said frequency converting unit further comprises:

quasi-synchronous and orthogonal detection means for obtaining a first detection output and a second detection output by performing multiplication of said first frequency converting carrier with said digital modulated wave and by performing multiplication of said second frequency converting carrier with said digital modulated wave;

analog to digital conversion means for digitally converting said first detection output and said second detection output, thereby producing a first unfiltered digital output and a second unfiltered digital output, respectively; and digital low pass filters for spectrum-shaping said first digital output and said second digital output, thereby producing said first digital signal and said second digital signal, respectively.

3. A demodulator according to claim 1, wherein said local oscillation unit further comprises:

a second numerical value control oscillator for oscillating said latched frequency error data, thereby producing an oscillated frequency error;

a data converter for data-converting said oscillated frequency error by one of a sine conversion characteristic and a cosine conversion characteristic, thereby producing a data-converted frequency error;

a D/A converter for analog-converting said data-converted frequency error, thereby producing analog frequency error data;

a multiplier for multiplying said analog frequency error data by an oscillation output of a fixed frequency oscillator, thereby producing a re-oscillated frequency error;

a band pass filter for filtering said re-oscillated frequency error, thereby producing a filtered frequency error; and a distributor for distributing said filtered frequency error, thereby producing said first frequency converting carrier and said second frequency converting carrier.

4. A demodulator according to claim 1, wherein said local oscillation unit further comprises:

a second numerical value control oscillator for oscillating said latched frequency error data, thereby producing an oscillated frequency error a first data converter for data-converting said oscillated frequency error by a sine conversion characteristic, thereby producing a first data-converted frequency error;

a second data converter for data-converting said oscillated frequency error by a cosine conversion characteristic, thereby producing a second data-converted frequency error;

a first D/A converter for analog-converting said first data-converted frequency error, thereby producing first analog frequency error data;

a second D/A converter for analog-converting said second data-converted frequency error, thereby producing second analog frequency error data;

a fixed frequency oscillator;

a first multiplier for multiplying said first analog frequency error data by a first oscillation output from said fixed frequency oscillator, thereby producing a first re-oscillated frequency error;

a second multiplier for multiplying said second analog frequency error data by a second oscillation output from said fixed frequency oscillator, thereby producing a second re-oscillated frequency error, wherein said second oscillation output has a different phase then said first oscillation output;

a synthesizer for synthesizing said first re-oscillated frequency error and said second re-oscillated frequency error, thereby producing a complete re-oscillated frequency error; and a band pass filter for filtering said complete re-oscillated frequency error, thereby producing a filtered frequency error;

a distributor for distributing said filtered frequency error, thereby producing said first frequency converting carrier and said second frequency converting carrier.

5. A demodulator for demodulating a digitally modulated wave, comprising:

a first local oscillation unit for modulating a first frequency converting carrier and a second frequency converting carrier, wherein said first frequency converting carrier and said second frequency converting carrier have carrier phase axes which are different;

a frequency converting unit for converting components of a first phase axis and a second phase axis of a digital modulated wave to a frequency band in accordance with said first frequency converting carrier and said second frequency converting carrier, respectively, thereby producing a first frequency converted signal and a second frequency converted signal, respectively, wherein said frequency band is substantially a base band;

analog to digital conversion means for digitally converting said first frequency converted signal and said second frequency converted signal, thereby producing a first digital signal and a second digital signal, respectively;

first complex multiplier means for multiplying said first digital signal and said second digital signal by a third reproducing carrier and a fourth reproducing carrier and for obtaining a first calculation output and a second calculation output, wherein said first calculation output and said second calculation output each having an expression which comprises a complex number;

digital low pass filters for spectrum-shaping said first calculation output and said second calculation output, thereby producing a first digitally shaped output and a second digitally shaped output;

second complex multiplier means for multiplying said first digitally shaped output and said second digitally shaped output by a fifth reproducing carrier and a sixth reproducing carrier and for obtaining a third calculation output and a fourth calculation output, wherein said third calculation output and said fourth calculation output each having an expression which comprises a complex number;

means for obtaining phase difference data and quadrant data corresponding to a phase expressed by said third calculation output and said fourth calculation output, and for obtaining a demodulation output having a multi-phase from said phase difference data and said quadrant data;

phase lock loop means, for producing said fifth reproducing carrier and said sixth reproducing carrier, wherein said phase lock loop comprises:

a first loop filter for filtering said phase difference data, thereby producing filtered phase difference data;

a first numerical value control oscillator for receiving said filtered phase difference data, and for generating oscillated phase difference data in accordance with said filtered phase difference data; and data conversion means for converting said oscillated phase difference data, thereby producing said fifth reproducing carrier and said sixth reproducing carrier; and automatic frequency control means for controlling an oscillation frequency of said third reproducing carrier and said fourth reproducing carrier, wherein said automatic frequency control means comprises:

a second loop filter for filtering a frequency error data, thereby outputting filtered frequency error data;

latch means for latching said filtered frequency error data, thereby outputting latched frequency error data;

frequency error detection means for receiving said phase difference data, and for producing and outputting said frequency error data in accordance with said received phase difference data, wherein said frequency error detection means comprises:

means for continuing an operation state of said automatic frequency control means by setting said output of said latch means to be in a through state and said output of said phase lock loop means to be in a fixing state when a value of said frequency error data is larger then a predetermined value, and for controlling said phase lock loop means to be in an operating state by maintaining said output of said latch means when said value of said frequency error data is smaller than said predetermined value;

a second local oscillation unit comprising a second numerical value control oscillator for receiving said latched frequency error data, and for generating an oscillated frequency error in accordance with said latched frequency error data; and data converters for modulating said oscillated frequency error, thereby producing said third reproducing carrier and said fourth reproducing carrier, wherein said third reproducing carrier and said fourth reproducing carrier each having a conversion characteristic which is one of a sine conversion characteristic and a cosine conversion characteristic, and wherein said conversion characteristic of said third reproducing carrier is different from said conversion characteristic of said fourth reproducing carrier.

* * * * *